United States Patent [19]

Hotta et al.

[11] Patent Number: 4,802,740
[45] Date of Patent: Feb. 7, 1989

[54] LIQUID CRYSTAL ALIGNMENT LAYER CONTAINING POLYVINYL-ALCOHOL AND TITANIUM-ALKOXIDE

[75] Inventors: Yoshio Hotta; Kenji Ohnuma; Akihiko Komura, all of Kanagawa, Japan

[73] Assignee: Canon Kabushiki Kaisha, Tokyo, Japan

[21] Appl. No.: 828,253

[22] Filed: Feb. 11, 1986

[30] Foreign Application Priority Data

Feb. 13, 1985 [JP] Japan .................. 60-24540
Feb. 15, 1985 [JP] Japan .................. 60-26506
Feb. 15, 1985 [JP] Japan .................. 60-26507

[51] Int. Cl.⁴ .................. G02F 1/133; C08F 8/00
[52] U.S. Cl. .................. 350/341; 525/61
[58] Field of Search .................. 430/20, 303; 428/1; 350/340, 341; 525/61

[56] References Cited

U.S. PATENT DOCUMENTS

| | | | |
|---|---|---|---|
| 3,334,057 | 8/1967 | Marks et al. | 525/61 |
| 4,016,129 | 4/1977 | Miyosawa | 428/446 X |
| 4,256,377 | 3/1981 | Krueger et al. | 350/340 |
| 4,496,647 | 1/1985 | Kawabe et al. | 430/303 |
| 4,647,680 | 3/1987 | Barfurth et al. | 427/126.1 |

FOREIGN PATENT DOCUMENTS

| | | | |
|---|---|---|---|
| 0013012 | of 1967 | Japan | 525/61 |
| 0138091 | 10/1978 | Japan | 525/61 |
| 0047910 | 10/1979 | Japan | 525/61 |
| 0087020 | 7/1981 | Japan | 350/334 |
| 6090804 | 7/1981 | Japan | 525/61 |
| 0101817 | 6/1982 | Japan | 350/341 |
| 0045426 | 3/1984 | Japan | 350/339 R |
| 0993468 | 5/1965 | United Kingdom | 525/61 |

Primary Examiner—William L. Sikes
Assistant Examiner—David Lewis
Attorney, Agent, or Firm—Fitzpatrick, Cella, Harper & Scinto

[57] ABSTRACT

A liquid crystal device comprising an alignment-controlling film formed by applying an aqueous solution containing one part by weight of polyvinyl alcohol and 2 to 4 parts by weight of titanium alkoxide to a substrate surface, followed by heating.

7 Claims, 1 Drawing Sheet

LIQUID CRYSTAL ALIGNMENT LAYER CONTAINING POLYVINYL-ALCOHOL AND TITANIUM-ALKOXIDE

BACKGROUND OF THE INVENTION

1. Field of the Invention

This invention relates to a liquid crystal device applicable to various displays, and more particularly to a liquid crystal device having an alignment-controlling film formed by applying an aqueous solution containing polyvinyl alcohol (which will be hereinafter referred to as "PVA") and titanium alkoxide, followed by heating.

2. Description of the Prior Art

PVA has been so far known as a material capable of forming a film capable of acting as an alignment-controlling film by heating at a relatively low temperature without using any toxic and inflammable organic solvent. PVA is soluble in water and thus safety control of working can be made easier by using water as a solvent. Furthermore, PVA has many advantages because the film can be formed by heating at a low temperature. For example, liquid crystal display devices using a plastic substrate or transistors can be prepared without any difficulty in spite of their low heat resistances. However, when an aqueous PVA solution is applied as such to a substrate, followed by heating, the resulting alignment-controlling film is hygroscopic and thus a liquid crystal display device of high durability cannot be obtained. Thus, researches have been so far made to remedy such a drawback of the film and provide a liquid crystal display device utilizing the advantages of PVA.

One of the so far proposed improvements is to form an alignment-controlling film by applying an aqueous PVA solution containing 0.5 to 2 parts by weight of titanium alkoxide per part by weight of PVA, followed by heating (Japanese Patent Laid-open Publication No. 45426/1984), where the hygroscopicity of the film is controlled by cross-linking reaction between PVA and titanium alkoxide by adding titanium alkoxide to PVA in such a range as not to impair to alignment control or insulation of the PVA film. The hygroscopicity of the PVA alignment-controlling film can be considerably improved by the addition of titanium alkoxide to the aqueous PVA solution but the hygroscopicity still remains to some extent. Thus, the alignment-controlling film must be provided only at the inner part of the substrate surface surrounded by a sealant in the sense of shutting off the external moisture sufficiently, thereby helping to increase the moisture resistance. To this end, at first the entire surface of a substrate is coated with an aqueous solution of PVA and titanium alkoxide by spinning, dip-coating, etc. to form a film, and then the film portion formed at the peripheral part of the surface is removed by etching. However, chromic anhydride to be used in the etching is hard to handle and there arise other problems such as a risk of incomplete etching etc.

On the other hand, application of an aqueous solution of PVA and titanium alkoxide to the desired area on a substrate by printing has been proposed. However, the aqueous solution of PVA and titanium alkoxide has a poor printability, and no uniform film can be obtained by printing.

As a result of evaluation of liquid crystal display devices having the alignment-controlling film formed from the said aqueous solution by the present inventors, it has been found through moisture resistance tests that in liquid crystal devices having electrodes arranged in a fine clearance there appears such a phenomenon that the adjacent interelectrode spacing acts as a pseudo-electrode to light a non-display segment.

That is, when an interwiring spacing in a display segment is made to be about 100 $\mu$m to about 50 $\mu$m to obtain a small liquid crystal device of high density, and when the insulation of the substrate surface at the interelectrode clearance is lowered even slightly due to the moisture absorption of the alignment-controlling film, the substrate surface at the spacing turns to a pseudo-electrode, giving a potential difference between this pseudo-electrode and the common electrode above the spacing. As a result, the wiring at the non-display segment is brought into a lighted state. Such a state is called "deterioration due to black stripe" (wiring being so narrow to cause stripe-like deterioration). Against the properly lighted display segment, the unlighted substrate surface around the segment acts as a pseudo-electrode and a lighted state is brought about between this pseudo-electrode and the common electrode provided in a large size in advance than that of the segment. This is called "deterioration due to blurring" (lighting being extended over the proper lighted display segment).

These black stripes and blurring appear at a very restricted distance, and thus are usually no problem at all in the ordinary display of a relative large image element, and have been so far unnoticed. As a result of researches to obtain fine patterns as a display of high reliability, the present inventors have moticed these phenomena for the first time.

In case of a liquid crystal device for color display, a color filter is usually provided on an electrode plate, where a color filter made from a gelatin film or PVA film dyed with a dye is used.

In case of using the gelatin film as a dyeing medium film, a liquid crystal display device with an overall satisfaction for the durability, display characteristics, etc. with relation to an alignment-controlling film serving also as a protective film to be laid on the gelatin film is hard to obtain. That is, the gelatin film as a dyeing medium film cannot be used together with an alignment-controlling film serving also as a protective film, which is formed by using an organic solvent or by curing at a high temperature, because of a low solvent resistance and a low heat resistance of the former. Thus, an alignment-controlling film with good adhesion is hard to obtain and also deterioration of adhesion is liable to occur between these two films.

On the other hand, in case of using a PVA film, it has been proposed to use a film with an improved moisture resistance by adding titanium alkoxide to PVA as an alignment-controlling film serving also as a protective film. In that case, the adhesion can be improved between the dyeing medium film and the alignment-controlling film serving also as a protective film, because they are made from the same material, but there are still the following problems. That is, though the moisture resistance can be improved by adding titanium alkoxide to PVA, the hygroscopicity is not completely eliminated thereby. When a PVA film is tightly laid on a modified PVA film with an improved moisture resistance by adding titanium alkoxide to PVA, the moisture absorption of the PVA film containing titanium alkoxide is accelerated, to the contrary, due to the hygroscopicity of the PVA film. As a result, the insulation of an alignment-controlling film serving also as a protective film is lowered, and satisfactory durability and display characteristics cannot be obtained. These problems have been overlooked, because the PVA film containing titanium alkoxide has been only used as an alignment-controlling film. It is the present inventors that have solved these problems for the first time as a result of the researches for using it also as a protective film.

SUMMARY OF THE INVENTION

An object of the present invention is to provide a liquid crystal display device of high density and high reliability without any occurrence of black stripes and blurrings by solving the said problems noticed by the present inventors.

Another object of the present invention is to provide a displayable liquid crystal display device capable of displaying a color image and having distinguished durability and display characteristics, comprising a PVA dyeing medium film and a PVA alignment-controlling film containing titanium alkoxide and serving also as a protective film by solving the said problems noticed by the present inventors.

According to an aspect of the present invention, there is provided a liquid crystal device which comprises an alignment-controlling film formed by applying onto a substrate an aqueous solution of polyvinyl alcohol and titanium alkoxide containing a water-soluble alcohol or glycol as a viscosity adjusting agent, followed by heating.

According to another aspect of the present invention, there is provide a liquid crystal device which comprises an alignment-controlling film formed by applying, according to printing method onto a desired region of a substrate, an aqueous solution of polyvinyl alcohol and titanium alkoxide containing a water-soluble alcohol or glycol as a viscosity adjusting agent, followed by heating.

According to a further aspect of the present invention, there is provide a liquid crystal device which comprises an alignment-controlling film formed by applying on a substrate a water solution controlling titanium alkoxide and polyvinyl alcohol, followed by heating, said titanium alkoxide being contained in a proportion of more than 2 parts by weight and not more than 4 parts by weight per part by weight of polyvinyl alcohol.

According to a still further aspect of the present invention, there is provide a liquid crystal device comprising a color filter prepared by coloring a dyeing medium film made of a polyvinyl alcohol and an alignment-controlling film covering said color filter, said alignment-controlling film being prepared by applying on a substrate a water solution containing titanium alkoxide and polyvinyl alcohol, said titanium alkoxide being contained at a proportion of more than 2 parts by weight and not more than 4 parts by weight per part of polyvinyl alcohol.

DESCRIPTION OF THE PREFERRED EMBODIMENTS

Figure 1:
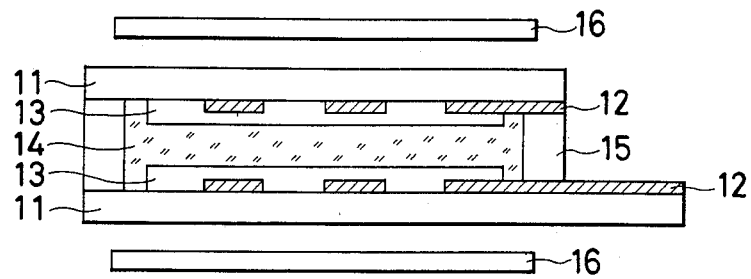
FIGS. 1 and 2 are vertical cross-sectional views showing basic structures of a liquid crystal display device according to the present invention.

The present invention is based on the finding that, as a result of extensive studies of the amount of titanium alkoxide to be added to PVA, there are no practical problems of alignment control and insulation even if more than 2 parts by weight of titanium alkoxide is added to one part by weight of PVA against the conventional concept that such a large amount of titanium alkoxide will impair the alignment control and insulation, and that the black stripes or blurrings can be prevented from occurrence when the film is used in a liquid crystal display device of high density.

The measures taken to solve the said problems are to provide a liquid crystal device with a film formed by coating an aqueous solution containing 1 parts by weight of polyvinyl alcohol and 2 to 4 parts by weight of titanium alkoxide onto a substrate surface, followed by heating, as an alignment-controlling film.

Preferable PVA for use in the present invention has a degree of polymerization of 1,000 to 3,000 and a degree of saponification of 98 to 100%. At a lower degree of polymerization and a lower degree of saponification, PVA is unsatisfactory in the moisture resistance, whereas PVA having a higher degree of polymerization has a poor water solubility. Either of these PVAs is less practical. In the present invention, reactive PVA having a functional groups such as an active carboxyl group, etc. on a part of the main chain can be preferably used.

Preferable titanium alkoxide for use in the present invention is a chelated titanium alkoxide, because it will give a good water solubility. Titanium alkoxide having a structure of $Ti(OR)_4$ derived from a lower alcohol is not preferable, because it is hydrolyzed in an aqueous solution to make the solution white turbid. Examples of preferable titanium alkoxide for use in the present invention include di-isopropoxy-bis(acetylacetonato)titanium, di-n-butoxy-bis(triethanolaminato)titanium, dihydroxy-bis(lactato)titanium, etc.

The mixing ratio of titanium alkoxide to PVA must be more than 2 and not more than 4 parts by weight of titanium alkoxide to one part by weight of PVA. Below 2 parts by weight of titanium alkoxide the black stripes or blurring cannot be completely prevented from occurrence when the thus obtained alignment control film is used in a liquid crystal display device of high density. On the other hand, above 4 parts by weight of titanium alkoxide, the alignment control and insulation of the thus obtained alignment-controlling film are not satisfactory.

Heating after the application of an aqueous solution containing PVA and titanium alkoxide is preferably carried out at about 180° to about 220° C. for 30 to 90 minutes. The thickness of the film is preferably about 800 to about 2,000 Å.

By heating, PVA and titanium alkoxide undergo cross-linking, whereby the hygroscopicity of the thus formed film can be suppressed. Particularly in the present invention, the hygroscopicity is suppressed more sufficiently by use of a larger amount of titanium alkoxide than that usually employed. According to the studies made by the present inventors, the alignment control and insulation of the thus obtained alignment-controlling film are practically satisfactory in spite of such a large amount of titanium alkoxide.

The present liquid crystal display device has the same structure as that of the conventional one except the composition of the alignment-controlling film, and is particularly suitable for a twist-nematic (TN) liquid crystal display device. Before describing the present invention referring to Examples, the basic structure of the present liquid crystal display device will be described, referring to FIG. 1.

In FIG. 1, numeral 11 denotes transparent insulating substrates, 12 transparent electroconductive films, 13 alignment-controlling films, 14 a liquid crystal, 15 a spacer acting also as a sealant and 16 polarizing plates.

By rubbing the alignment-controlling film in a predetermined direction, the molecules of liquid crystal 14 can be aligned in the predetermined direction. The space to be filled with the liquid crystal 14 is fully surrounded by the sealant 15 except one opening, and the liquid crystal 14 is filled into the space through the opening, which is then sealed. This example relates to a transmission type structure. A reflection type structure can be provided by providing the one of the polarizing plates 16 with a reflecting plate. The present invention is suitable for a TN liquid crystal display device, but is also widely applicable to a liquid crystal device utilizing homogeneous alignment based on the alignment treatment by rubbing.

According to a preferable embodiment of the present invention, an alignment-controlling film for the liquid crystal device can be formed by adding a water-soluble alcohol or a glycol as a viscosity-adjusting agent to an aqueous solution containing PVA and titanium alkoxide, applying the solution to a desired area on the substrate surface by printing, followed by heating.

The water-soluble alcohols and glycols for use in the present invention as a viscosity-adjusting agent include those having a good miscibility with the aqueous PVA solution and being stable by themselves, and more particularly include for example, ethyl alcohol, methyl alcohol, propyl alcohol, ethylene glycol, propylene glycol, etc. The amount of the water-soluble alcohol depends upon the required film thickness, the specification of printer used, the specification of printing plate used, etc. The viscosity-adjusting agent is added thereto in view of these parameters to make the aqueous solution of PVA and titanium alkoxide have an appropriate viscosity.

In the present invention, such printing as offset printing, relief printing, screen printing, etc. can be employed.

After the application of the aqueous solution of PVA and titanium alkoxide containing the water-soluble alcohol or glycol onto the desired area on the substrate surface by printing, heating is carried out preferably at about 180° to about 220° C. for 30 to 90 minutes. Preferable film thickness is about 600 to about 2,000 Å.

Even by the addition of the water-soluble alcohol, etc., the cross-linking reaction between PVA and titanium alkoxide is not inhibited, and the water-soluble alcohol, etc. can be easily evaporated off on the heating after the application. Thus, there is no fear at all of deterioration of the alignment-controlling characteristic and insulation of the thus formed film. Particularly, by the addition of water-soluble alcohol, the aqueous solution of PVA and titanium alkoxide can have a viscosity suitable for printing and also an improved wettability toward the substrate and the printing plate. Thus, uniform application to a desired area by printing can be attained 0.1 to 100 parts by weight, preferably 5 to 50 parts by weight, of the viscosity-adjusting agent can be contained per part by weight of PVA.

In case of color display liquid crystal device, measures made to solve the problems are to provide a liquid crystal device with a dyeing medium film of PVA as a color filter and a film formed by applying an aqueous solution containing one part by weight of PVA and 2 to 4 parts by weight of titanium alkoxide, followed by heating as an alignment-controlling film serving also as a protective film.

At first, description of color filter will be made below.

Preferable PVA for forming the dyeing medium film is PVA having a degree of polymerization of 1,000 to 3,000 and a degree of saponification of 98 to 100%. With PVA having a lower degree of polymerization and a lower degree of saponification, the resulting film has unsatisfactory durability, whereas at a higher degree of polymerization, the water solubility is insufficient. Either of these PVAs is less practical. With the view to improving adhesion to the alignment-controlling film serving also as a protective film, reactive PVA having a functional groups such as a carboxyl group, etc. on a part of the main chain is preferable.

According to the present invention, the aqueous PVA solution is applied to a substrate, followed by heating, whereby a dyeing medium film can be obtained. Then, the dyeing medium film is dyed into any desired color with a dye to obtain a color filter. Dye for coloring the dyeing medium includes trisazo dye, copper-containing trisazo dye, tetrazo dye, etc. Heating for making a dyeing medium film is carried out at about 150° to about 220° C. for 30 to 60 minutes, and its thickness is preferably about 800 to about 3,000 Å.

Description will be made of the alignment-controlling film serving also as a protective film. Preferable PVA is those having a degree of polymerization of 1,000 to 3,000 and a degree of saponification of 98 to 100%. At a lower degree of polymerization and a lower degree of saponification, the moisture resistance of PVA is not satisfactory, whereas at a higher degree of polymerization the water solubility is insufficient. Either of these is less practical. In the present invention, it is particularly preferable to use reactive PVA having a functional group such as active carboxyl group, etc. on a part of the main chain.

Preferable titanium alkoxide is a chelated titanium alkoxide with the view to obtaining a good water solubility. Titanium alkoxide having a structure $Ti(OR)_4$ derived from a lower alcohol is hydrolyzed when its aqueous solution is to be prepared, and makes the solution white turbid. Titanium alkoxides preferably used in the present invention include diisopropoxy-bis-(acetylacetonate)titanium, di-n-butoxy-bis(triethanolaminato)titanium, dihydroxy-bis(lactato)-titanium, etc.

The mixing ratio of titanium alkoxide to PVA is 2 to 4 parts by weight of titanium alkoxide to one part by weight of PVA. Below 2 parts by weight of titanium alkoxide, the moisture absorption caused by close adhesion of dyeing medium PVA film cannot be completely prevented. On the other hand, above 4 parts by weight, the alignment control and insulation of the thus obtained alignment-controlling film are not satisfactory.

After the application of the aqueous solution of PVA and titanium alkoxide, heating is carried out preferably at about 180° to about 220° C. for 30 to 90 minutes. The film thickness is preferably about 800 to about 2,000 Å.

The hygroscopicity of the alignment-controlling film serving also as a protective film can be suppressed by cross-linking reaction between PVA and titanium alkoxide. Particularly in the present invention, an amount of titanium alkoxide added is so large that the action to suppress the hygroscopicity becomes strong. Thus, even if a color filter of hygroscopic PVA film is provided on the back side of the alignment-controlling film, a satisfactory moisture resistance can be obtained. Furthermore, the dyeing medium film as a color filter, and the alignment-controlling film or the alignment-controlling film serving also as a protective film are the same PVA-based films, and thus a very good adhesion can be obtained therebetween.

According to the studies made by the present inventors, the alignment control and insulation of the thus obtained films are quite satisfactory in spite of such a large amount of titanium alkoxide added.

The present liquid display device has the same structure as that of the conventional one except the compositions of the dyeing medium film and the alignment-controlling film serving also as a protective film, and is particularly suitable for a twist nematic (TN) liquid display device. Before describing Examples, the basic structure of the present liquid crystal display device will be described, referring to FIG. 2.

Figure 2:
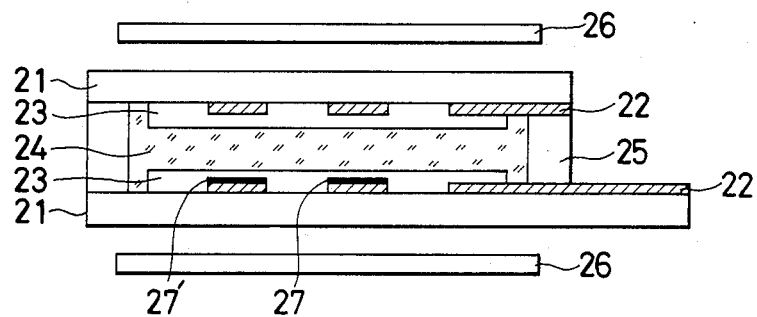

In FIG. 2, numeral 21 denotes transparent insulating substrates, 22 transparent electroconductive films, 23 alignment-controlling films serving also as a protective film, 24 a liquid crystal, 25 a spacer serving also as a sealant, 26 polarizing plate and 27 and 27' are color filters. By rubbing the alignment-controlling films serving also as a protective film 23, in a predetermined direction, the molecules of liquid crystal 24 can be aligned in the predetermined direction. The space to be filled with the liquid 24 is surrounded with the sealant 25 except one opening, and the liquid crystal 24 is filled into the space through the opening. Then, the opening is sealed. This example shows a transmission type structure. Reflection type structure can be provided by providing one of polarizing plates 26 with a reflecting plate. The present invention is suitable for TN liquid crystal, but can be also widely applied to a liquid crystal device utilizing a homogeneous alignment based on the alignment treatment by rubbing.

Example 1

A TN type liquid display device was prepared which has an available display dimension of 20 mm×30 mm, 7-segment display and designed pattern display constituted of 40 segments, with a distance between the adjacent wirings to the respective segments being usually 100 μm and an interelectrode distance of minimum 50 μm, as structure as shown in FIG. 1. The alignment-controlling film for the device was prepared by application of a solution containing 100 parts by weight of dihydroxy-bis(lactato)titanium and 48 parts by weight of PVA in water and ethyleneglycol as solvents, as shown in the following Table, to prepare a film, followed by heating at 200° C. for 80 minutes. The alignment-controlling film had a thickness of 1,000 Å. The device was placed in a Pressure Cooker tester and subjected to a lighting test at 6 V, whereby it was found that, even after 24 hours, occurrence of black stripes and blurring was zero among 20 devices tested, and the display state was good throughout.

Examples 2 to 4

Test was carried out in the same manner as in Example 1, except that the coating solutions having the compositions shown in the following Table were used. It was found that, even after 24 hours, occurrence of black stripe and blurring was zero among 20 test devices, and the display state was good throughout.

Comparative Example 1

Test was carried out in the same manner as in Example 1 except that the coating solution having the composition shown in the following Table was used. It was found that, after 24 hours, black stripes and blurring occurred in 7 test devices out of 10 test devices by the lighting test.

TABLE

|  | Titanium alkoxide used (parts by weight) | PVA (parts by weight) |
| --- | --- | --- |
| Example 1 | A 100 | 48 |
| Example 2 | A 100 | 40 |
| Example 3 | A 100 | 30 |
| Example 4 | B 100 | 40 |
| Example 5 | C 100 | 40 |
| Comparative Example 1 | A 50 | 50 |

A: Dihydroxy-bis(lactato) titanium
B: Di-isopropoxy-bis(acetylacetonate) titanium
C: Di-n-butoxy-bis(triethanolaminato) titanium In the present invention, not only the said TN liquid crystal, but also highly dielectric liquid crystals disclosed in U.S. Pat. No. 4,367,924 can be used.

According to the present invention, the moisture resistance can be improved, and a liquid crystal display device with a high reliability can be obtained without any disturbance in display due to the occurrence of black stripes and blurring. At the same time, adhesion of an alignment-controlling film to a substrate can be increased, and thus durability against a thermal shock, etc. can be also increased. Another advantage is formation of an alignment-controlling film from pollution-free materials by a low temperature process.

Example 6

A patterned PVA film was provided on a glass substrate as a dyeing medium film, and dyed with a copper-containing trisazo dye, Sumilite Supra CGL Gray (made by Sumitomo Chemical Industry Co., Japan) as a dye to obtain a color filter. Then, a film was formed on the color filter by applying thereto a solution containing 100 parts by weight of dihydroxy-bis(lactato)titanium and 48 parts by weight of PVA in a mixture of water and ethyleneglycol, followed by heating at 200° C. for 80 minutes to obtain an alignment-controlling film serving also as a protective film. Then, rubbing, adhesion with a sealant, filling of a liquid crystal, etc. were carried out in the ordinary manner as required to prepare a liquid crystal device shown in FIG. 2. The display device was placed into a Pressure Cooker tester (temperature 121° C., relative humidity 100%, 24 hours under 2 atms) to conduct a lighting test at 6 V. No poor display was found. Thus, a good display state was confirmed.

Comparative Example 2

A liquid crystal display device was prepared and tested in the same manner as in Example 6 except that a solution containing 50 parts by weight of dihydroxy-bis-(lactato)titanium and 50 parts by weight of PVA was used to form an alignment-controlling film serving also as a protective film. It was found that, after 24 hours, poor display occurred in 8 test devices among 10 devices according to the lighting test.

In the present invention, not only the said TN liquid crystal, but also the ferroelectric liquid crystal disclosed in U.S. Pat. No. 4,367,924 can be used.

According to the present invention, a good adhesion can be obtained between the color filter and the alignment-controlling film serving also as a protective film and also a good moisture resistance can be obtained. Thus, a liquid crystal display device capable of color display with a good durability and a good display can be provided.

Example 7

An aqueous 7 wt.% solution of Gohsefimer 2200 (a trademark of PVA made by Nihon Gosei Kagaku Kogyo K.K., Japan) was prepared. Then, 2 parts by weight of dihydroxy-bis(lactic acid)titanate was added thereto on the basis of one part by weight of PVA in the aqueous solution to make an aqueous solution of PVA and titanium alkoxide.

Then, 75 parts by weight of ethyleneglycol as a viscosity-adjusting agent was added to 100 parts by weight of the aqueous solution, and then the resulting mixture was applied to a glass substrate surface having a transparent electrode patterned in a predetermined pattern by an offset printer. A printing plate of APR (trademark of a printing plate made by Asahi Kasei Kogyo K.K., Japan) was used.

After the application of the aqueous mixture by the offset printer, the substrate was heated at 220° C. for 60 minutes, followed by the ordinary steps, as required, such as rubbing, adhesion by a sealant, filling of liquid crystal, etc. to prepare a liquid crystal display device in the structure shown in FIGS. 1 and 2. Then, the liquid crystal display device was kept at a temperature of 85° C. and a relative humidity of 85%, and subjected to a accelerated durability test. Deterioration was determined by the electric current of the liquid crystal display device. As a result, it was found that, even after 1,000 hours, a current increase was by less than 10%, and a satisfactory ability was observed in the liquid crystal display.

It was confirmed that appropriate viscosity of the aqueous mixture was 40 to 60 cp for the offset printing using the printing plate of APR, and an alignment-controlling film having a thickness of 600 to 1,000 Å could be obtained.

Example 8

A liquid crystal display device was prepared in the same manner as in Example 7, except that propyleneglycol was used as a viscosity-adjusting agent in Example 7. The thus obtained liquid crystal display device was subjected to accelerated durability test in the same manner as in Example 7, and it was found that a current increase was by less than 10% even after 1,000 hours, and a satisfactory ability was observed in the liquid crystal display.

Comparative Example 3

A liquid crystal display device was prepared in the same manner as in Example 7 except that the same amount of water was used in place of the viscosity-adjusting agent in Example 7. The alignment-controlling film of the liquid crystal display device was not uniform, and no satisfactory ability was obtained in the liquid crystal display from the beginning.

In the present invention not only the said TN liquid crystal, but also the ferroelectric liquid crystal displayed in U.S. Pat. No. 4,367,924 can be used.

According to the present invention, application of an aqueous solution of PVA and titanium alkoxide for forming an alignment-controlling film can be exactly carried out to a desired area by printing, and thus the production efficiency can be considerably improved.

What we claim is:

1. A liquid crystal device, which comprises an alignment-controlling film formed by applying on a substrate a water solution comprising polyvinyl alcohol and titanium alkoxide, followed by heating, said titanium alkoxide being contained in a proportion of more than 2 parts by weight and not more than 4 parts by weight per part by weight of polyvinyl alcohol.

2. A liquid crystal device according to claim 1, wherein the polyvinyl alcohol has a degree of polymerization of 1,000 to 3,000.

3. A liquid crystal device according to claim 1, wherein the polyvinyl alcohol has a degree of saponification of 98 to 100%.

4. A liquid crystal device according to claim 1, wherein the polyvinyl alcohol is reactive polyvinyl alcohol having a functional group on a part of the main chain.

5. A liquid crystal device according to claim 4, wherein the functional group is a carboxyl group.

6. A liquid crystal device according to claim 1, wherein the titanium alkoxide is di-isopropoxy-bis-(acetylacetonate)titanium, di-n-butoxy-bis-(triethanolaminate)titanium, or dihydroxy-bis-(lactato)-titanium.

7. A liquid crystal device according to claim 1, wherein the alignment-controlling film has a thickness of 800 to 2,000 Å.

* * * * *